United States Patent

Qureshi et al.

[11] Patent Number: 6,084,582
[45] Date of Patent: *Jul. 4, 2000

[54] METHOD AND APPARATUS FOR RECORDING A VOICE NARRATION TO ACCOMPANY A SLIDE SHOW

[75] Inventors: Imran Iqbal Qureshi, Sunnyvale; Bakul Vinodchandra Patel, Santa Clara; Paul O. Warrin, Sunnyvale, all of Calif.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/886,898

[22] Filed: Jul. 2, 1997

[51] Int. Cl.[7] .................................................. H04N 3/14
[52] U.S. Cl. ............................................................. 345/302
[58] Field of Search .................................... 704/278, 270; 369/4, 5, 14; 345/348, 340, 302

[56] References Cited

U.S. PATENT DOCUMENTS

| | | | |
|---|---|---|---|
| 3,712,723 | 1/1973 | Gerry | 353/19 |
| 3,809,467 | 5/1974 | Sprinkle | 353/15 |
| 4,009,331 | 2/1977 | Goldmark et al. | 386/38 |
| 5,164,839 | 11/1992 | Lang | 386/54 |
| 5,363,482 | 11/1994 | Victor et al. | 345/346 |
| 5,500,936 | 3/1996 | Allen et al. | 345/340 |
| 5,515,490 | 5/1996 | Buchanan et al. | 395/807 |
| 5,664,087 | 9/1997 | Tani et al. | 345/473 |
| 5,781,186 | 7/1998 | Jennings | 345/302 |
| 5,917,480 | 6/1999 | Tafoya et al. | 345/302 |

FOREIGN PATENT DOCUMENTS 0 585 628  8/1993  European Pat. Off. ........ G11B 27/30

OTHER PUBLICATIONS

Jesshope, C. et al.,"Web based teaching: a minamalist approach", Jul. 5, 1996, Proceedings of the second Australasian conference on computer sciences education.
Jesshope C. et al.,"Low–bandwidth multimedia tools for web–based lecture publishing", Aug. 1998, pp. 149–154, Eng Sci Ed Jou.
Schill, A. et al., "Configuration management for distributed object–oriented applications", 1990, 577–581, ITS 90 Telecommunications Symposium.
Blakowski, G. "Supporting multimedia information presentation in a distributed, heterogenous environment", 1990, pp. 29–35, IEEE.
Blakowski, G., "A media syncronization survey: reference model, specification and case studies", 1996, pp. 5–35, IEEE.
Aboud G. D., "teaching and learning as multimedia authoring: the classroom 2000 project", Nov. 22, 1996, pp. 187–198, ACM Multimedia Conf. 96.
Compel "Using Compel" Asymetrix pp. 3,8,240,244,245, 302,308, 1993.

(List continued on next page.)

*Primary Examiner*—David R. Hudspeth
*Assistant Examiner*—Harold Zintel
*Attorney, Agent, or Firm*—Christensen O'Connor Johnson & Kindness PLLC

[57] ABSTRACT

A computer-based system and method of recording and playing back audio narration to accompany an electronic slide show presentation is disclosed. The method includes a slide show recording session, during which a series of slides are sequentially displayed. During the recording session, a segment of audio input corresponding to the display of each slide within a slide presentation is recorded and digitized. Each digitized audio segment is stored and associated with its corresponding slide. Audio data may be embedded within a slide, or alternatively stored in a file and linked to a slide. During a subsequent performance of the slide show, when each slide is displayed, its corresponding audio segment is retrieved and played back. The method also stores timings corresponding to each slide during the slide show recording session, and optionally uses these timings to advance slides during the subsequent slide show presentation.

29 Claims, 7 Drawing Sheets

OTHER PUBLICATIONS

Astound "Astound Version 2.0 for Windows" 1995, Gold Disk, pp. 155,161,167,290.

Baldwin "Madison Avenue Multimedia: create easy and affordable multimedia presentations" Jul. 1992, PC Sources, p. 438.

Srikanthan et al, "Multi–Media Network Mailing System" IEEE, pp. 53–57, Sep. 11, 1993.

*Delta Graph Professional, For Macintosh*, Delta Point, Inc., Monterey, California, 1989. Chapter 13.

*Microsoft PowerPoint for Window 95, Step by Step*, Microsoft Press, Redmond, Washington, 1995. "Getting Ready"; Lessons 1,2,12, and 13; Appendix B.

METHOD AND APPARATUS FOR RECORDING A VOICE NARRATION TO ACCOMPANY A SLIDE SHOW

FIELD OF THE INVENTION

The present invention relates to the field of slide presentation computer software and, in particular, to methods and systems for recording audio to accompany a slide show.

BACKGROUND OF THE INVENTION

Slide presentation programs are computer programs that enable a user to create, edit, manage, and perform "presentations" on a computer. One example of a popular slide presentation program is Microsoft PowerPoint®, available from Microsoft Corporation, of Redmond, Wash. A slide presentation includes a set of electronic "slides," each slide corresponding to one screen or page of output. An electronic slide may also be converted to a 35 mm slide or overhead transparency and displayed in a standard slide projector or overhead projector. Each slide contains one or more objects, such as text, graphical images, or graphical animation. A slide may also include a sound object that is played when the slide is displayed during a "slide show" performance.

A slide presentation program "performs" a "slide show" by sequentially displaying a series of slides contained within the slide presentation. The slides are displayed on a computer screen or projected onto a separate surface. During a performance of a slide show, a user controls the performance by invoking commands to "advance" to the next slide. A command can be entered using a keyboard, a mouse, or other suitable input device. Alternatively, an author of a slide presentation can include slide "timings" with each slide. A slide timing corresponding to a slide indicates the number of seconds that the slide is displayed before the slide presentation program automatically advances to the next slide. During a performance of a slide show, the slide presentation program automatically advances to the next slide when the existing slide's timing ends.

When creating or editing a slide presentation, an author can manually enter a timing corresponding to each slide by entering a numeric value and associating it with a corresponding slide. Alternatively, an author can "rehearse" a slide show performance. A slide show rehearsal is a special mode of operation, where a slide presentation is performed. During the performance, an author enters commands to advance each slide. The slide presentation program automatically records the timing corresponding to each slide, and saves the recorded slide timings. When a subsequent slide show is performed, the slide presentation program uses the slide timings recorded during the slide show rehearsal.

Typically, while a presenter performs a slide show for a group of people, the presenter provides a spoken narration that accompanies the performance. It may be inconvenient or uneconomical to have the presenter narrate and perform the slide show every time one or more people desire to view the presentation. In a number of situations, an individual may desire to view a slide show when a presenter is not available to provide voice narration. For example, it may be desirable to allow workers to view slide presentations containing training information at their convenience, rather than at a fixed time and location when a presenter is available. Or, a slide presentation can be made available on a large network, such as the Internet, that allows individuals to download the slide presentations and perform slide shows on their local computers. Performing a slide show on a local computer without the accompanying voice narration reduces the effectiveness of the slide presentation as a communication mechanism.

It is desirable to have a mechanism that allows a slide presentation author to automatically record a voice narration corresponding to a set of slides in a slide presentation. Preferably, such a mechanism will record a voice narration during a slide show rehearsal and automatically associate each slide with its corresponding portion of the voice narration. Additionally, a preferable mechanism will automatically play back the voice narration corresponding to each slide during a subsequent slide show performance, and automatically advance the slides according to timings saved during the slide show rehearsal. The present invention is directed to providing such a mechanism.

SUMMARY OF THE INVENTION

In accordance with this invention, a system and computer based method of recording and playing back audio narration to accompany a slide show is provided. The method includes a slide show recording session during which a series of slides are sequentially displayed. During the recording session, a segment of audio input corresponding to the display of each slide within the slide presentation is recorded and digitized. Each digitized audio segment is stored in memory and associated with its corresponding slide. During a subsequent performance of the slide presentation, when each slide is displayed, its corresponding audio segment is retrieved and played back.

In accordance with other aspects of this invention, each recorded audio segment is stored in a computer sound file and a reference for locating each audio segment computer sound file is stored with the corresponding slide. Preferably, each recorded audio segment is stored in a discrete computer sound file, such that each computer sound file contains exactly one audio segment.

In accordance with still other aspects of this invention, each digitized audio segment is saved as a block of data in the computer memory and associated with its corresponding slide. The slides within the slide presentation and their corresponding digital audio segments are stored together in one computer file.

In accordance with yet still other aspects of this invention, the method automatically determines a time value that represents the length of each audio segment. The time value for an audio segment is stored with its corresponding slide. During the subsequent playback of the slide show, the stored timings are used to automatically advance each slide. Preferably, a user controlling the slide presentation program during the playback slide show performance is provided with options of whether to play the recorded audio segments and whether to use the stored timings.

As will be readily appreciated from the foregoing description, a method of recording and playing back audio narration to accompany a slide show performed in accordance with the invention provides a way of enhancing a slide presentation by adding audio narration. The invention allows a slide presentation author to create an enhanced slide presentation that can be used by individuals without the presence of a live narrator. A slide presentation enhanced by the invention can be made available over networks, such as the Internet, downloaded by an individual, and performed at the individual's convenience. The invention allows enhanced slide presentations to be performed economically and conveniently by individuals without sacrificing the accompaniment of a presenter. Sight impaired people, or other people who have difficulty reading text, can benefit from enhanced presentations produced by the methods of the invention. Information kiosks can also employ enhanced slide presentations produced by the methods of the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a mechanism for recording audio, and in particular audio narration, to accompany a set of slides stored on a computer storage medium. The mechanism of the invention records the narration during a slide show recording session, creating one or more segments of sound data representing the recorded sound, one segment corresponding to each slide. The sound data is automatically saved and embedded or linked with the presentation. During a subsequent slide show, the mechanism of the invention automatically retrieves and plays back the segment of the narration corresponding to the currently displayed slide.

Figure 1:
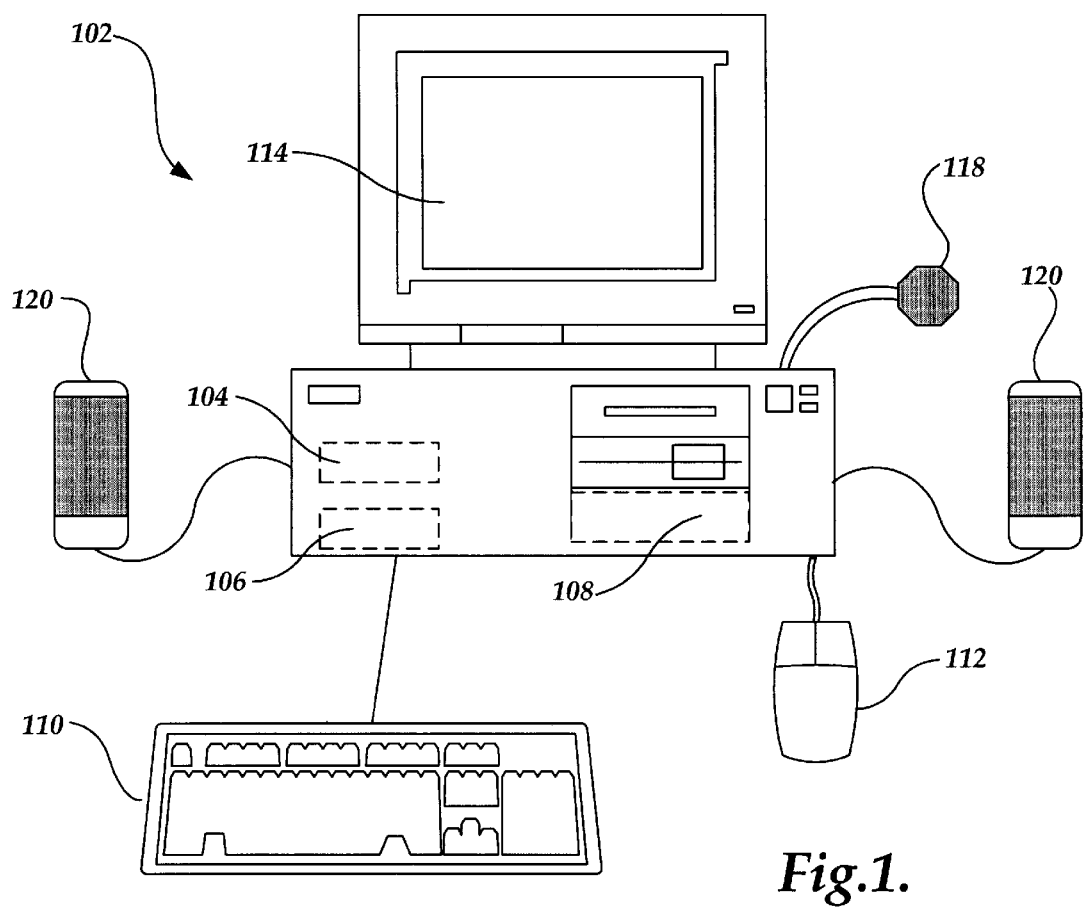
FIG. 1 is a pictorial diagram illustrating a computer system for implementing the present invention.

In accordance with the present invention, a slide presentation program executes on a computer, preferably a personal computer. FIG. 1 illustrates a computer system 102 for implementing the present invention. The computer system 102 generally comprises a central processing unit 104, an internal memory 106, and a permanent storage medium, such as a disk drive 108. The computer system 102 also includes a keyboard 110 and a pointing device, such as a mouse 112, for entering commands and data. The central processing unit 104 generates a graphical user interface that is shown on a display screen or monitor 114.

The computer system 102 further includes circuitry, such as a sound card (not shown), for recording and playing audio signals. An audio input device, such as a microphone 118, connected to the sound card receives audio signals during recording, and an audio output device, such as a set of speakers 120, plays the audio during playback.

An operating system and a slide presentation application program, as well as other programs, preferably reside in the internal memory 106 and execute on the central processing unit 104. Those skilled in this art, and others, should appreciate that the mechanism of the present invention may be practiced on computer systems with varying architectures.

Figure 2:
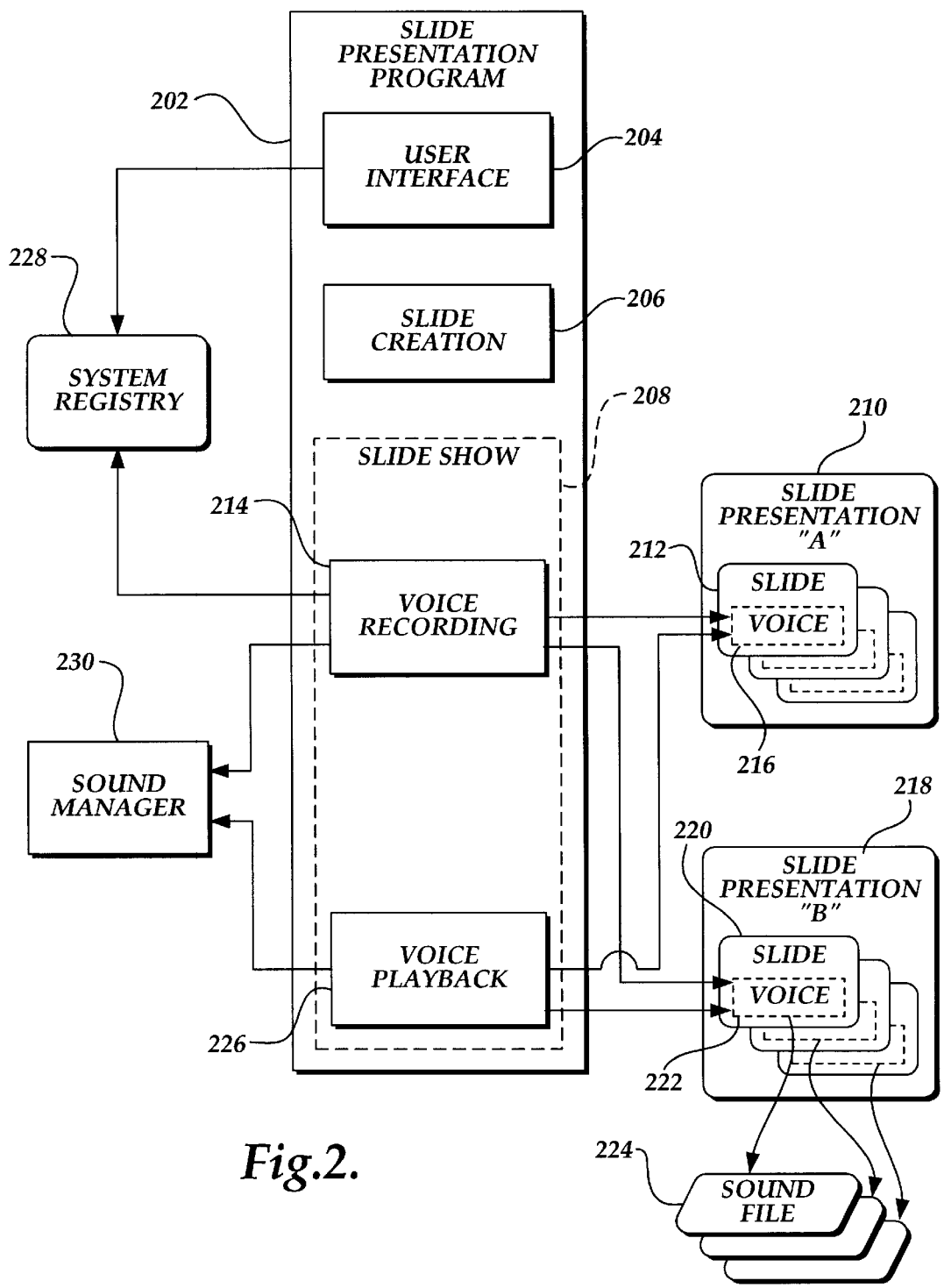
FIG. 2 is a block diagram illustrating an architecture of a slide presentation program, in accordance with the present invention.

FIG. 2 illustrates the architecture of a slide presentation program 202 in accordance with the present invention. A slide presentation program 202 provides a user with the ability to create and edit a set of one or more "slides" 212 or 220, and to "present" or display one or more of the set of slides. The set of slides is referred to as a "slide presentation" 210 or 218. A slide presentation 210 or 218 is generally stored on a computer storage medium, such as a disk drive. A slide is a discreet collection of visual information, and includes text, graphic images, or animation. The slide may also include an audio portion that is embedded in the slide and played when the slide is visually displayed.

The slide presentation program 202 includes a user interface (UI) module 204. The UI module 204 presents a "Record Narration" dialog window 302 (FIG. 3), discussed in further detail below. Briefly, the Record Narration dialog window displays information pertaining to currently set parameters controlling the recording of audio narration. The UI module 204 also presents a "Record Settings" dialog window, which allows a user to specify the quality of sound recording. The slide presentation program 202 also includes a slide creation module 206, which provides a user with the ability to create, edit, and organize a set of slides. Techniques for creating, editing, and organizing a set of slides are known in the art, and are not discussed in detail here, except where relevant to the present invention.

The slide presentation program 202 further includes a slide show module 208 that contains program code for controlling an electronic slide show. During an electronic slide show, the slide show module 208 retrieves a slide 212 or 220 and displays the slide on an output medium, such as a display screen 114 (FIG. 1). Since a slide can contain multimedia data, displaying a slide includes playing audio data, as well as visually displaying the content of the slide. Specifically, displaying a slide includes displaying the text and graphics contained within the slide, which may include animation, and playing a "sound clip" embedded in the slide. A sound clip is a block of data representing sound, and may be stored in one of a plurality of storage formats. "WAVE" and Musical Instrument Digital Interface ("MIDI") are two well-known formats for storing audio data. The audio interchange file format (AIFF) is a well-known format for storing audio data on Apple Macintosh computers.

The slide show module 208 provides several options for presenting an electronic slide show. The slide show module may automatically display a predetermined sequence of slides 212 or 220, displaying each slide for a corresponding predetermined amount of time. Alternatively, the slide show module 208 may display each slide 212 or 220 of a predetermined sequence of slides, pausing after displaying each slide until a user performs an operation instructing the slide show module to "advance," by retrieving and displaying the next slide in the sequence of slides. The slide show module 208 also provides the ability for a user to present slides in a sequence that is not predetermined, by specifying the number or name of a slide 212 or 220 within the slide presentation 210 or 218. A slide 212 or 220 may also have "links" built into it by a slide author using the slide creation module 206. A link includes a visual area on the slide and a corresponding address of a target slide. When a user selects the link area on the slide, the slide show module 208 automatically retrieves and displays the designated target slide. The target slide may be a slide within the same slide presentation 210 or 218 as the current slide, or it may be a slide in a different slide presentation.

The slide show module 208 also provides an ability to "perform" a slide show recording session. During a slide show recording session, the slide show module 208 sequentially retrieves and displays slides 212 or 220 within the slide presentation 210 or 218. A slide presentation author indicates when a transition to the next slide is to be made, by entering a command using the keyboard 110 (FIG. 1), mouse 112, or other input device. The slide show module 208 records the amount of time that each slide 212 or 220 is displayed, and stores the amount of time corresponding to each slide. During a subsequent slide show performance, the slide show module 208 retrieves the recorded amount of time corresponding to a currently displayed slide, displays the current slide for the specified duration of time, and then automatically retrieves and displays the next slide in a predetermined sequence. In this manner, the slide show module 208 performs a slide show with slide transition timings matching the timings during the previous slide show recording session.

The slide show module 208 includes a voice recording component 214 that records audio narration during a slide show recording session. As discussed in further detail below, the voice recording component records, via the computer microphone 118 (FIG. 1), an audio narration and stores the audio data in the computer memory 106 or storage device, i.e., the disk drive 108. The voice recording component 214 creates a voice data object 216 or 222 for each slide 212 or 220 displayed during the slide show recording session, and stores the voice data object 216 or 222 with its corresponding slide 212 or 220, respectively.

The voice data object 216 or 222 may represent the recorded audio data in a number of ways. In one actual embodiment, two mechanisms for storing the audio data are provided, and a user selects one of the two mechanisms. In the first mechanism, illustrated by slide presentation "A" 210 in FIG. 2, the voice data object 216 contains a block of binary data that represents the audio in an audio recording format, as discussed above. The binary block of data is "embedded," or stored with, its corresponding slide 212.

Slide presentation "B" 218 illustrates an alternative mechanism. The voice data object 222 contains an identifier that represents the name and location of a computer sound file 224. The computer sound file 224 contains binary data representing the recorded audio. Preferably, the voice recording component 214 creates one computer sound file 224 containing voice data for each slide 220 that is displayed during the slide show recording session in which the audio narration is recorded.

As depicted in FIG. 2, each slide 212 within slide presentation "A" 210 has an embedded binary block of data in its corresponding voice data object 216, and each of the slides 220 within slide presentation "B" 218 has a corresponding computer sound file 224 that is linked to the voice data object 222 of the slide 220. In one actual embodiment, both the embedded voice mechanism and the linked voice mechanism can be employed in a single slide presentation. As discussed in further detail below, a slide presentation author selects, at the beginning of a slide show recording session, whether to embed or link voice data with corresponding slides. However, a slide show recording session may include a subset of slides within a slide presentation 210 or 218. Therefore, multiple slide show recording sessions with different mechanisms selected may result in a mixture of audio data storage mechanisms in a single slide presentation 210 or 218.

The slide show module 208 also includes a voice playback component 226 that controls the playing of audio narration during a slide show performance. As explained in further detail below, during a slide show performance, when the slide show module 208 retrieves and displays a slide 212 or 220, the voice playback component 226 retrieves the corresponding voice data object 216 or 222 and plays the recorded audio narration. If the voice data object contains a link to a sound file 224, the voice playback component 226 retrieves the linked sound file 224 and plays the audio from this file.

In one actual embodiment in the invention, the slide presentation program 202 employs two operating system components: a system registry 228 and a sound manager 230. The system registry 228 operates as a database of information pertaining to application programs that execute on the computer system 102 (FIG. 1). Windows 95 provides a system registry that is employed by application programs to store configuration information for subsequent retrieval. The slide presentation program 202 stores information pertaining to the recording of audio narration in the system registry. In particular, the user interface module 204 stores information representing the level of sound quality that the voice recording component 214 employs when recording audio narration. The user interface module 204 also stores the address of a directory where linked sound files 224 containing voice data are stored by the voice recording component 214, if the user selects the option to link sound files, rather than embed the audio data within slides. The voice recording component 214 subsequently retrieves the sound quality information and linked sound file destination information prior to beginning the recording of audio narration during a slide show recording session.

The sound manager 230 provides operating system services related to the recording and playback of audio signals. The Windows 95 operating system provides a sound manager 230 that uses a Media Control Interface (MCI). The MCI is a high-level application programmer interface that provides capabilities for controlling audio devices in a device-independent manner. The voice recording component 214 invokes the sound manager 230, using the MCI, to record each audio segment. The sound manager records the audio signals and creates digital data in a specified audio format. During a slide show, the voice recording component 226 invokes the sound manager 230 to play back an audio segment. Because the Media Control Interface is well documented, it is not explained in detail herein. As should be understood by one skilled in the art of computer programming, and others, operating systems other than Windows 95, or utility programs, may provide the services of the Windows 95 sound manager employed by the present invention. The processes of voice recording and voice playback are discussed in further detail below.

Figure 3:
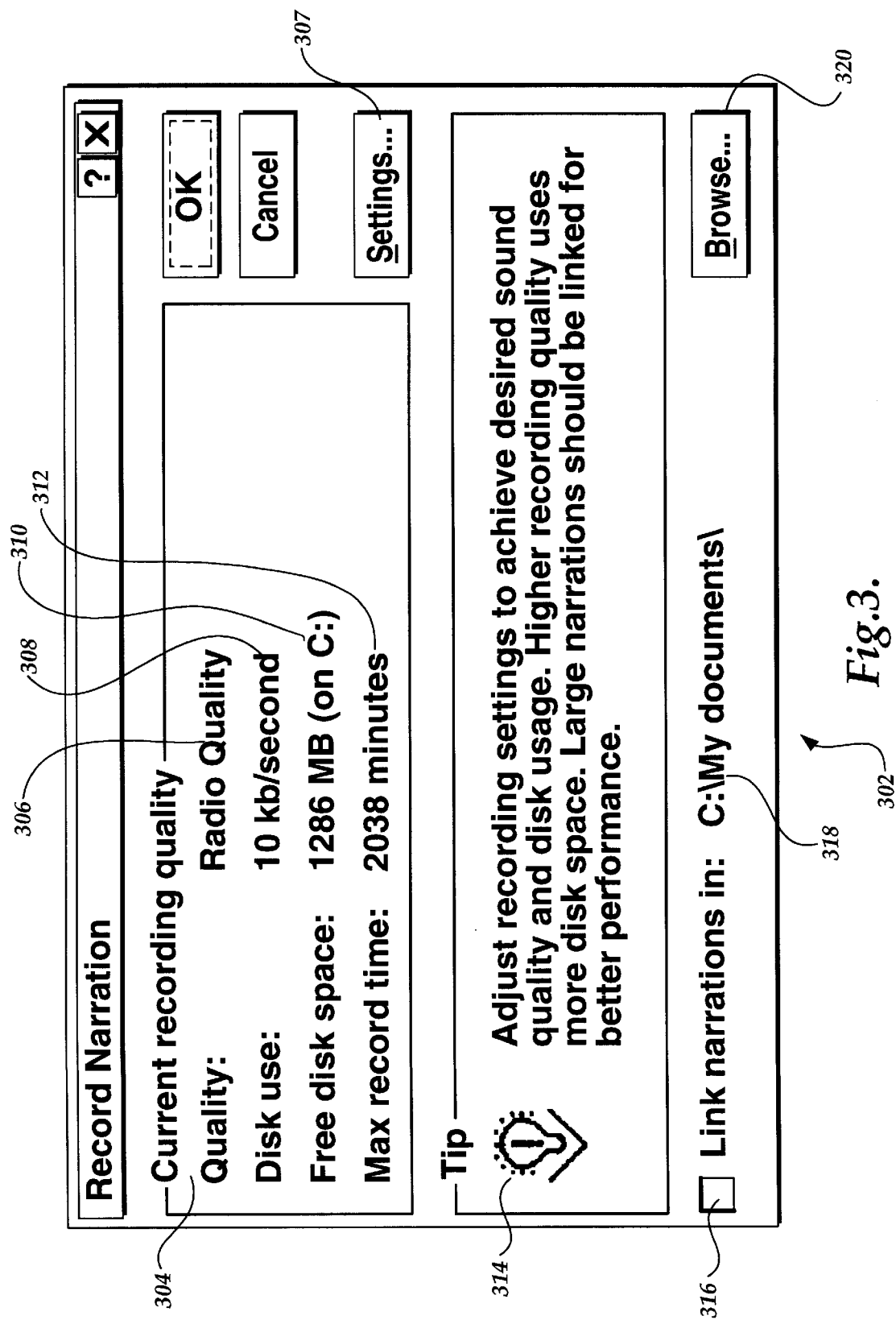
FIG. 3 is a pictorial representation of a "Record Narration" dialog window produced in accordance with the present invention.

FIG. 3 illustrates a "Record Narration" dialog window 302 that is displayed and controlled by the user interface module 204 (FIG. 2) in one actual embodiment of the invention. The user interface module 204 displays the "Record Narration" dialog window 302 in response to a user's selection of a menu item in the slide presentation program 202. The "Record Narration" dialog window 302 includes a current recording quality area 304 that displays information pertaining to the current selection of recording quality. A "quality setting" control 306 displays the current recording quality setting. A quality settings push button control 307 causes the operating system to display a sound selection dialog window (not shown) that allows a slide presentation author to select from a predefined set of recording quality specifications. The quality setting control 306 depicted in FIG. 3 illustrates a recording quality setting of "radio quality."

The recording quality setting affects the amount of disk space that is required to store audio data. High quality settings require a relatively large amount of disk space, while lower quality settings require less disk space. The amount of disk space required per second of audio recording is displayed in a "disk use" control 308. As depicted in FIG. 3, radio quality recording requires 10 kilobytes of disk space for each second of recording.

A "free disk space" control 310 and a "maximum record time" control 312 provide a slide presentation author with information regarding the amount of audio that can be recorded using the computer's storage medium. The free disk space control displays the amount of disk space available on the storage medium. The maximum record time control displays the amount of audio recording that can be stored on the computer storage medium using the current setting of recording quality. The maximum record time is dependent on the amount of available disk space, as displayed in the free disk space control 310 and the rate of disk use as displayed in the disk use control 308. A "tip" control 314 displays information explaining the relationship between sound quality and disk usage.

The Record Narration dialog window also includes a "link narrations" check box 316 that provides a user with a choice between embedding the audio data within each slide or linking a sound file to each slide. A corresponding link directory field 318 displays a disk directory that is used to store linked sound files, if the link narrations option is selected. A browse push button 320 displays a dialog window (not shown) that allows a slide presentation author to select a new link directory.

Figure 4:
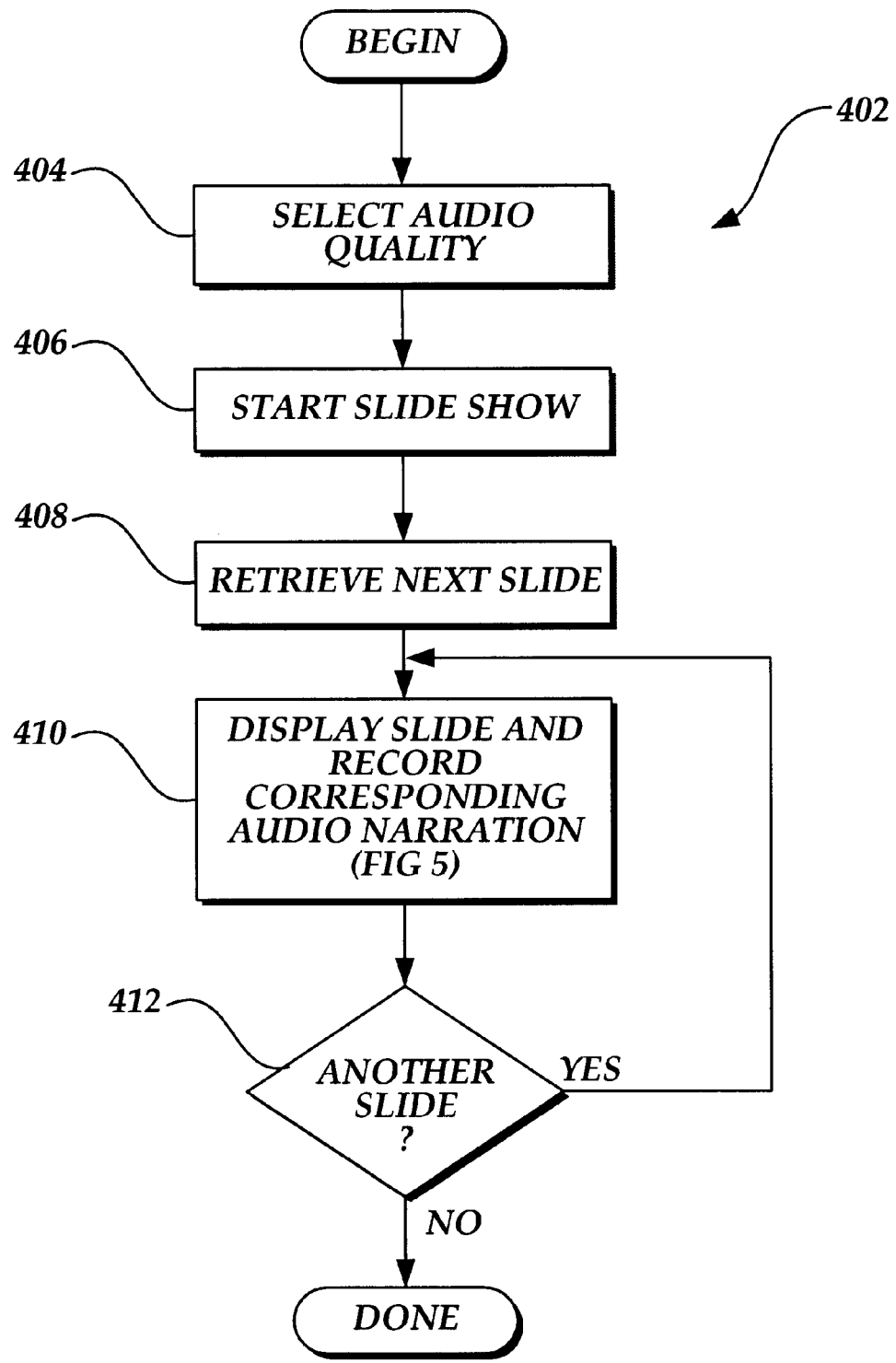
FIG. 4 is a flow diagram illustrating the process of recording audio to accompany a slide presentation.

FIG. 4 illustrates the process 402 of recording an audio narration to accompany the display of slides during a slide show. FIG. 4 is discussed with references to the components illustrated in FIG. 2. In one actual embodiment, the process 402 of recording an audio narration is initiated in response to a slide presentation author invoking a menu item command to begin audio narration recording. At step 404, the user interface module 204 displays the record narration dialog window 302 (FIG. 3) and allows a slide presentation author to select an audio quality setting that is used during the recording session. As discussed above, the selected audio quality setting is stored within the system registry 228 for subsequent retrieval by the voice recording component 214 in the slide show module 208. In one actual embodiment, the audio quality setting saved in the system registry 228 applies to all subsequent recording sessions on the computer, until a new setting is selected. The setting, therefore, is not limited to the current slide presentation.

Figure 5:
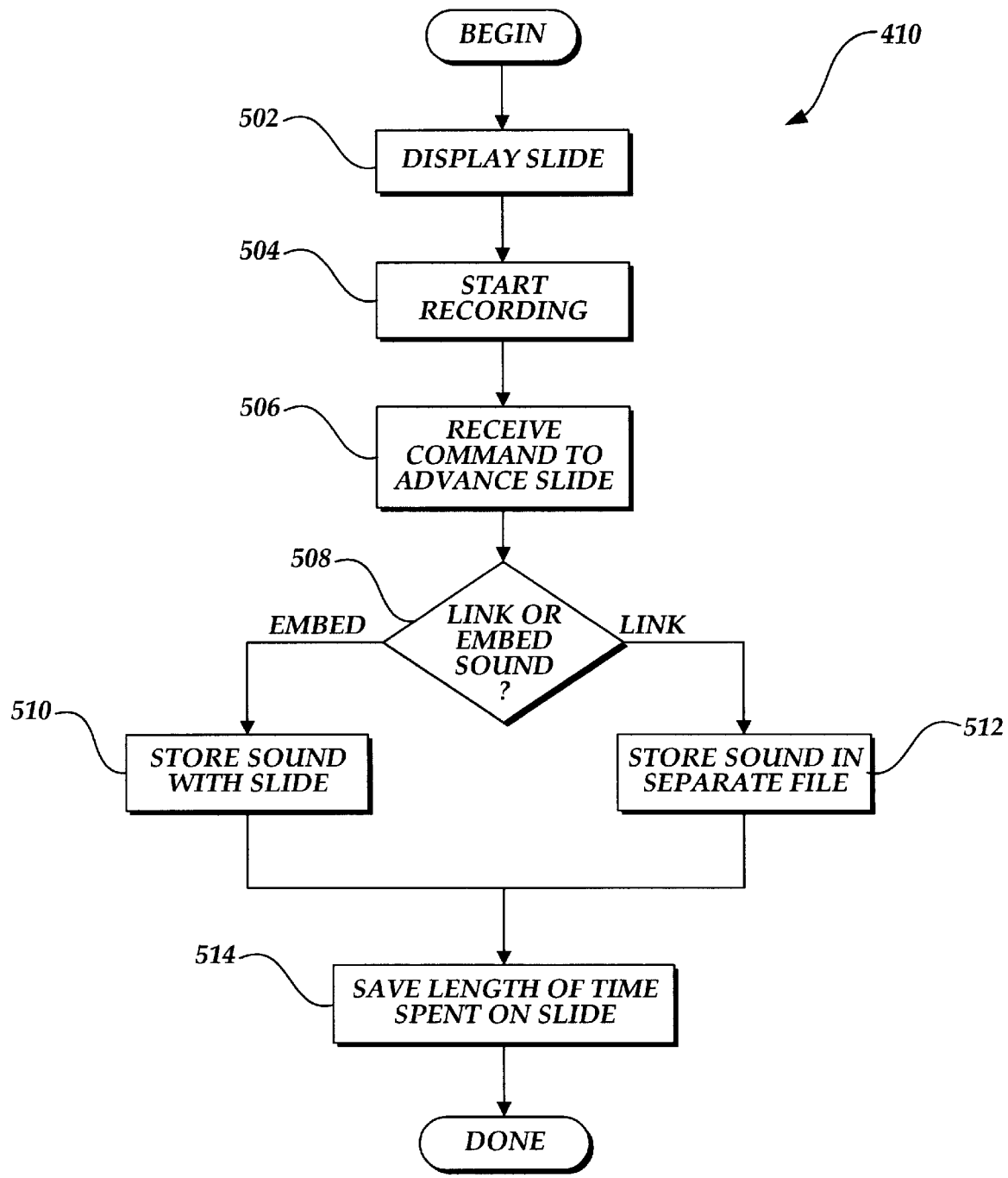
FIG. 5 is a flow diagram illustrating, in further detail, a portion of the process of recording audio to accompany a slide presentation.

At step 406, the slide show module 208 begins a slide show recording session. At step 408, the slide show module 208 retrieves the first slide 212 or 220 in a predetermined sequence of slides. At step 410, the slide show module 208 displays the retrieved slide and the voice recording component 214 records the audio narration. The process of displaying a slide and recording the corresponding audio is illustrated in FIG. 5 and discussed in further detail below. At step 412, a test is made to determine whether another slide 212 or 220 exists in the predetermined sequence of slides. If another slide exists, control flow returns to step 408 to retrieve the next slide. If another slide does not exist in the predetermined sequence, the slide show recording session and recording session is complete.

FIG. 5 illustrates in further detail the step 410 (FIG. 4) of displaying a slide 212 or 220 and recording the corresponding audio narration. At step 502, the slide show module 208 displays the current slide. At step 504, the voice recording component 214 starts recording the audio narration. The step of starting the audio recording includes invoking the sound manager 230 of the operating system with an instruction to begin recording.

At step 506, the slide show module 208 receives a command to advance to the next slide. In one actual embodiment, this command to advance is triggered by a slide presentation author clicking on a mouse button while the pointer is on the currently displayed slide.

In response to receiving a command to advance the slide, the voice recording component 214, employing the sound manager 230, stores the digitized recorded sound. Prior to storing the sound, a determination is made of whether the current setting pertaining to storing sound specifies that sound data is to be embedded with the current slide or stored as a separate sound file and linked with the current slide. If the current setting specifies embedding (as illustrated by slide presentation "A" 210), at step 510, the voice recording component 214 stores a voice data object containing a block of voice data with the current slide. If, at step 508, the current setting specifies linking sound data (as illustrated by slide presentation "B" 218), at step 512, the sound manager 230 creates a new sound file 224 and stores the digitized sound data in the new sound file. The voice recording component 214 stores a voice data object 222 with the current slide 220, the voice data object containing the name of the sound file containing the new voice data. In one actual embodiment, when a voice data object is stored with a slide at step 510 or at step 512, an icon is displayed in a corner of the slide to indicate that an audio segment is stored and associated with the slide. To delete an audio segment stored and associated with a slide 212 or 220, a presentation author deletes the icon on the corresponding slide.

After performing either step 510 or step 512, flow proceeds to step 514. At step 514, the voice recording component stores, with the current slide 212 or 220, an amount representing the length of time spent displaying the current slide. After saving the time value, step 410 is completed and flow continues at step 412 (FIG. 4), where the slide show module 208 determines whether another slide 212 or 220 exists in the predetermined sequence of slides.

Figure 6:
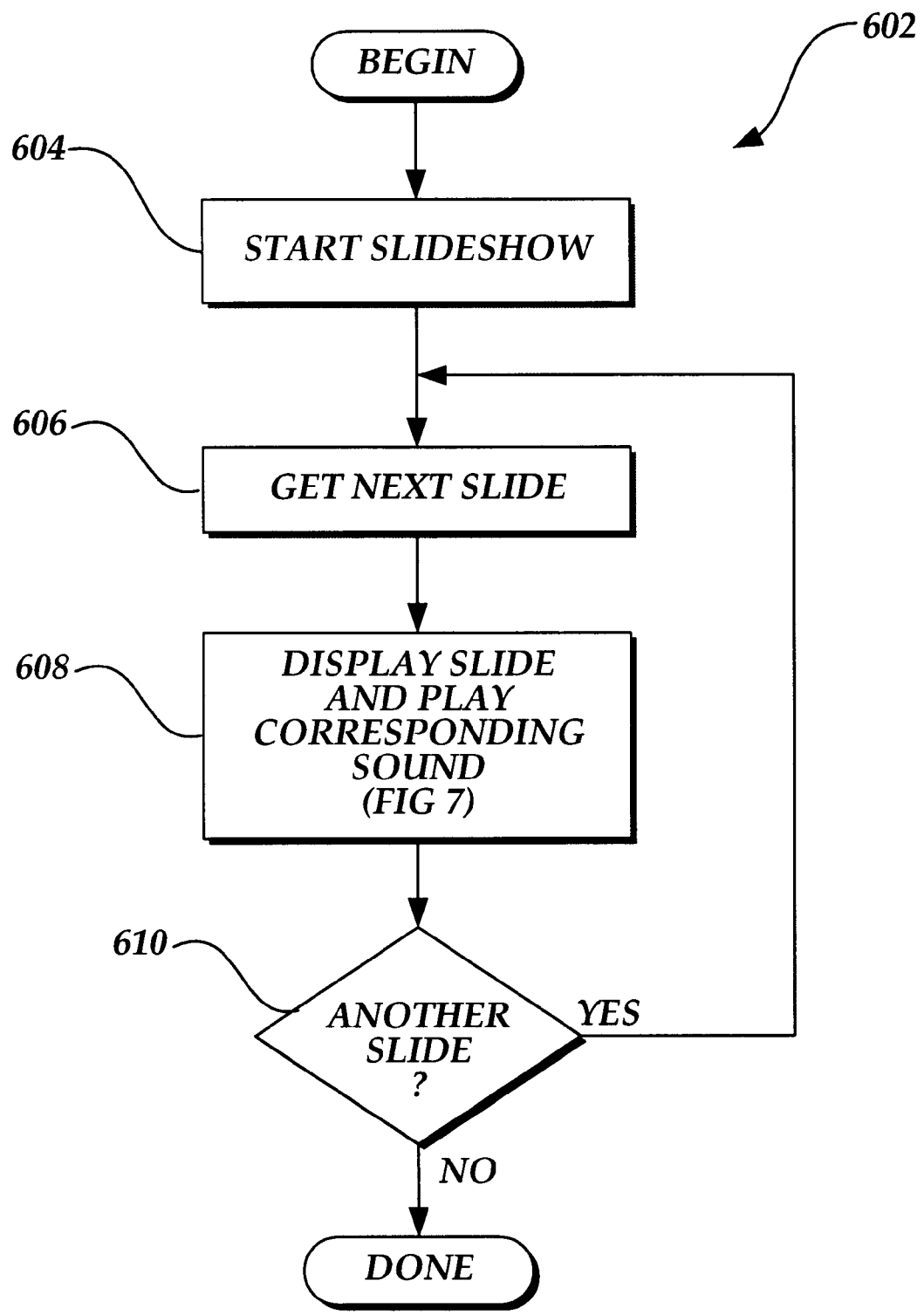
FIG. 6 is a flow diagram illustrating the process of playing back audio to accompany a slide presentation.

FIG. 6 illustrates a process 602 of playing back recorded audio narration during a slide show performance. FIG. 6 is discussed with references to the components illustrated in FIG. 2. At step 604, the slide show module 208 begins a slide show performance. This may be performed in response to a command by a user to start a slide show performance. Alternatively, a slide show may be performed automatically, upon invocation of the slide presentation program 202.

At step 606, the slide show module 208 retrieves the first slide 212 or 220 in the predetermined sequence of slides. At step 608, the slide show module 208 displays the retrieved slide and plays the corresponding audio narration. The step of playing audio narration is illustrated in FIG. 7, and described in further detail below.

At step 610, the slide show module 208 determines whether another slide 212 or 220 exists in the predetermined sequence of slides. If another slide exists, control flow returns to step 606 to retrieve the next slide. If another slide does not exist, the process 602 of performing a slide show is completed.

Figure 7:
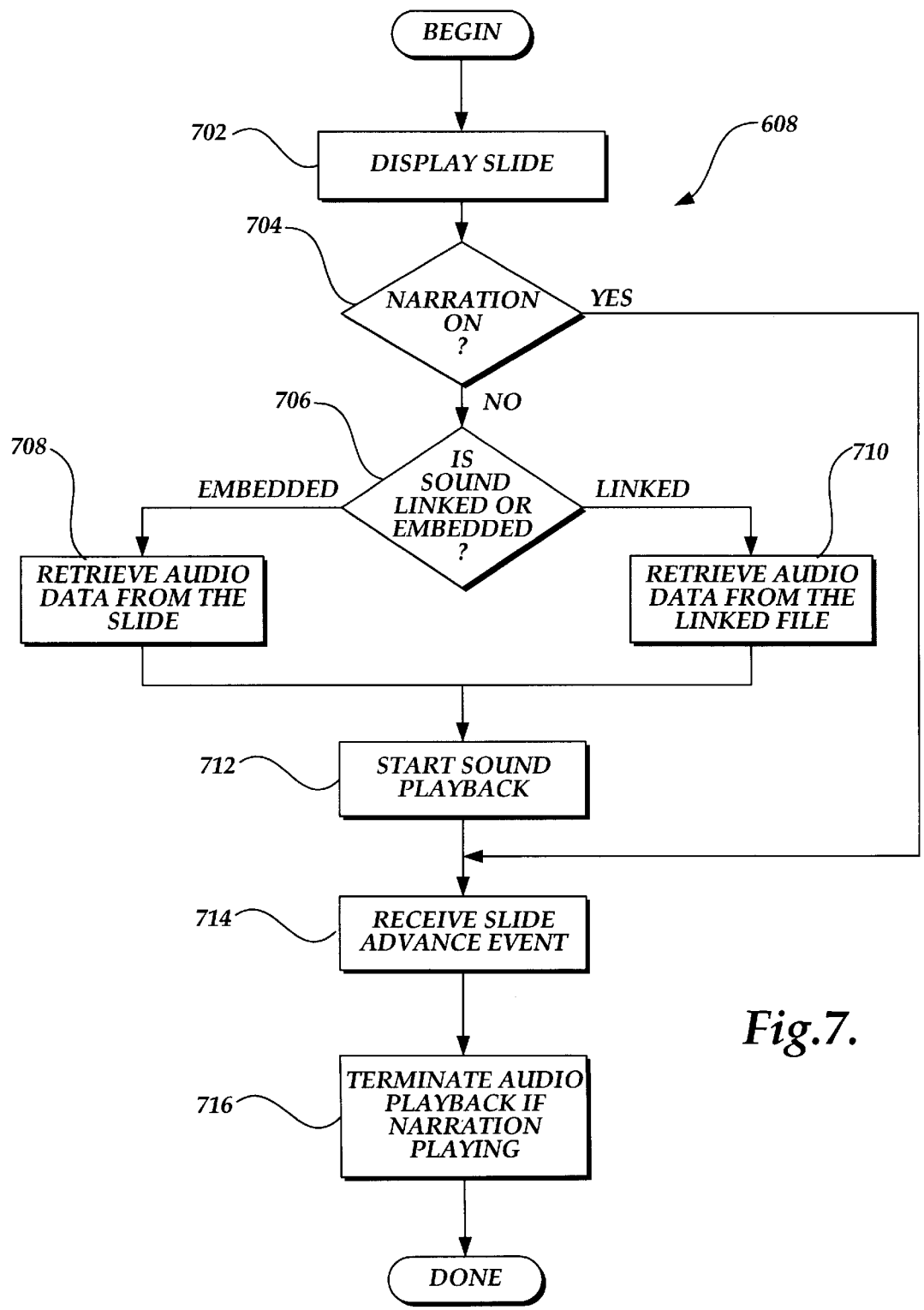
FIG. 7 is a flow diagram illustrating, in further detail, a portion of the process of playing back audio to accompany a slide presentation.

FIG. 7 illustrates in further detail the step 608 of displaying a slide 212 or 220 and playing the corresponding recorded audio narration. At step 702, the slide show module 208 displays the current slide 212 or 220. At step 704, a test is made to determine whether a narration setting is turned on for the current slide presentation. The user interface module 204 provides a slide presentation author the ability to specify whether narration is turned on or off for each slide presentation 210 or 218. If narration is not turned on, any audio narration associated with the current slide 212 or 220 is not played, and the process continues at step 714, discussed below.

If the narration setting is on, flow control proceeds to step 706, where a test is made to determine whether the voice data object 216 or 222 contains embedded data or a link to a sound file 224. If the voice data object contains embedded data, flow proceeds to step 708. At step 708, the voice playback component 226 retrieves the audio data from the current slide 212. If, at step 706, the voice playback component 226 determines that the voice data object contains a link to a sound file, at step 710, the voice playback component 226 retrieves the audio data from the linked sound file 224. In one actual embodiment, at step 710, the voice playback component 226 retrieves only the name of the linked sound file. Following step 708 or step 710, control proceeds to step 712, where the voice playback component 226 instructs the sound manager 230 to begin sound playback, and the sound manager commences to play the retrieved sound data. Step 712 includes invocation of the sound manager 230 by the voice playback component 226, and the passing of appropriate information specifying the audio data or linked sound file. If the audio data is embedded, the voice playback component passes a reference to a block of memory containing the audio digital data. If the audio data is in a linked sound file 224, at step 712, the voice playback component 226 passes the file name to the sound manager 230.

While the sound manager 230 plays the recorded audio, the slide show module 208 waits for an event indicating when to advance to the next slide. One such event is a user command. At any time during the playback of the audio narration, a user may enter a command instructing the slide presentation program 202 to advance to the next slide 212 or 220. If the displayed slide has a corresponding timing, the expiration of time also causes such an event. Since a slide presentation author can edit timing values, the timing for a slide is not always equal to the duration of an audio segment. At step 714, the slide show module 208 receives an advance slide event, such as a user command or an expiration of time. At step 716, if an audio segment is playing when the slide advance event is received, the slide show module 208 terminates the audio playback by calling the sound manager 230.

Following step 716, the step 608 of displaying a slide and playing the corresponding audio narration is completed. Flow proceeds to step 610 (FIG. 6) to determine whether another slide exists to be displayed.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for recording an audio signal to accompany a slide show, comprising:
   (a) a computer including a computer memory and an operating system;
   (b) a display device coupled to the computer for providing a display;
   (c) an audio input device coupled to the computer for receiving the audio signal;
   (d) a slide presentation program for displaying a set of at least one slide on the display device;
   (e) a mechanism for enabling automatic recording of an audio segment in response to receiving a command to advance the display of the set of slides, each audio segment corresponding to a duration of the audio signal corresponding to a slide from the set of slides, wherein at least a portion of the audio segment corresponding to each slide is recorded during a time when at least a portion of the corresponding slide is displayed;
   (f) a mechanism for associating each audio segment with its corresponding slide; and
   (g) a mechanism for selectively enabling the playback of each audio segment, when its corresponding slide is displayed and enabling the automatic advancement of the slide for a slide show to be determined by a length of each corresponding audio segment.

2. The system of claim 1, wherein the recording mechanism converts each duration of the audio signal to a corresponding audio segment, and each audio segment is a digital representation of its corresponding duration of the audio signal.

3. The system of claim 2, wherein the recording mechanism stores the audio segments in at least one computer file, and wherein the associating mechanism stores with each slide a reference for locating its corresponding audio segment in a corresponding computer file.

4. The system of claim 3, wherein each computer file contains exactly one audio segment.

5. The system of claim 2, wherein the recording mechanism stores the audio segments in the computer memory and the associating mechanism associates each audio segment with its corresponding slide.

6. The system of claim 2, wherein each audio segment is embedded in its corresponding slide.

7. The system of claim 2, wherein the associating mechanism stores with each slide a reference for locating its corresponding audio segment.

8. The system of claim 1, wherein the associating mechanism automatically stores with each slide a value representative of a duration of time for its corresponding audio segment.

9. The system of claim 1 further comprising:
   (a) an audio playback device coupled to the computer for playing the audio segments;
   (b) wherein the slide presentation program performs a slide show recording session, the recording mechanism recording a plurality of audio segments concurrently with the slide show; and
   (c) wherein the slide presentation program performs the presentation of the slide show by displaying each slide, the audio playback device playing each audio segment that is selected to play concurrently with the display of its corresponding slide.

10. The system of claim 9, wherein the associating mechanism automatically stores with each slide a duration value representative of the duration of time for its corresponding audio segment, and wherein during the playback slide show, the slide presentation program automatically advances the slides based on the duration value corresponding to each slide.

11. A method in a computer system for recording audio data corresponding to at least one slide in a slide show, comprising:
   (a) displaying at least one of the plurality of slides;
   (b) in response to receiving a command to advance the display of the plurality of slides, enabling automatic recording of the audio data in a plurality of audio segments, each audio segment corresponding to a slide that is displayed during the recording of the audio data corresponding to the displayed slide and;

(c) storing the recorded plurality of audio segments;

(d) associating each audio segment with its corresponding slide, wherein each audio segment is determinable from its corresponding slide;

(e) enabling the selective playing of each audio segment when its corresponding slide is displayed; and (f) enabling a length for each audio segment to determine the automatic advancement of its corresponding slide during the presentation of a slide show.

12. The method of claim 11, wherein the recording step further comprises:

(a) receiving an analog audio signal;

(b) converting the analog input signal to a digital audio signal; and (c) wherein each audio segment comprises a duration of the digital signal.

13. The method of claim 12, wherein the storing step further comprises storing each recorded audio segment in a computer file, and wherein the associating step further comprises storing with each slide a reference for locating its corresponding audio segment in a corresponding computer file.

14. The method of claim 12, wherein the storing step further comprises storing each recorded audio segment in a corresponding computer sound file containing exactly one audio segment.

15. A program storage device readable by a machine, tangibly embodying at least two computer files comprising:

(a) at least one computer sound file containing all audio segment, the computer sound file produced according to the method of claim 14; and (b) a presentation computer file containing a plurality of slides, each slide including at least one object that is capable of being displayed by a computer, each slide having a reference to a corresponding computer sound file, the reference produced according to the method of claim 14.

16. The method of claim 12, wherein the storing step further comprises storing the audio segment as a block of data in the computer memory.

17. The method of claim 12, wherein the storing step further comprises storing the audio segments and the slides together in one computer file.

18. A program storage device readable by a machine, tangibly embodying at least one computer file comprising:

(a) at least one computer sound file containing audio data representing a voice audio signal, the computer sound file produced according to the method of claim 17; and (b) a plurality of slides, each slide including at least one object that is capable of being displayed by a computer, each slide having a correspondence to the audio segment produced according to the method of claim 17.

19. The method of claim 12, further comprising:

(a) displaying a first slide, (b) receiving a command to advance to a second slide, the second slide immediately following the first slide in a predetermined ordering of the plurality of slides;

(c) in response to the command, displaying the second slide; and (d) in response to the command, automatically beginning recording of the audio segment corresponding to the second slide.

20. The method of claim 19, further comprising:

(a) receiving a second command to advance to a third slide, the third slide immediately following the second slide in the predetermined ordering of the plurality of slides;

(b) in response to the second command, terminating the recording of the audio segment corresponding to the second slide; and (c) in response to the second command, automatically beginning recording of the audio segment corresponding to the third slide.

21. The method of claim 11, further comprising:

automatically storing a time value with each slide, the time value representative of the length of an audio segment corresponding to the slide.

22. A method in a computer system for recording and playing back an audio signal for a voice narration that corresponds to a plurality of slides in a slide show, comprising:

(a) performing a slide show recording session by displaying at least one of the plurality of slides;

(b) in response to receiving a command to advance the display of the plurality of slides, enabling automatic recording of the audio signal in a plurality of audio segments, each audio segment corresponding to a duration of the audio signal with a display of a corresponding slide during the performance of the slide show recording session and;

(c) storing the recorded audio segments;

(d) associating each audio segment with its corresponding slide, wherein each audio segment is determinable from its associated slide;

(e) selectively enabling the playing of each audio segment when its corresponding slide is displayed;

(f) presenting the slide show by displaying at least a portion of the plurality of slides;

(g) playing each enabled audio segment concurrently with the display of its corresponding slide during the presentation of the slide show; and (h) enabling a length of each audio segment to determine the automatic advancement of its corresponding slide during the presentation of the slide show.

23. The method of claim 22, wherein the storing step further comprises storing each recorded audio segment in a computer file, the associating step further comprises storing with each slide a reference for locating its corresponding audio segment in a corresponding computer file, and the playback slide show performance step further comprises retrieving the computer file corresponding to each slide.

24. The method of claim 22, further comprising:

(a) automatically storing a time value with each slide, the time value being representative of a length of the audio segment corresponding to the slide; and (b) wherein presenting the slide show further comprises automatically terminating the display of each slide based on its associated time value.

25. A program storage device readable by a machine, tangibly embodying instructions that are executable by the machine to perform a method for recording audio data corresponding to a plurality of slides, comprising:

(a) sequentially displaying the plurality of slides;

(b) in response to receiving a command to advance the display of the plurality of slides, enabling automatic recording of the audio data as a plurality of audio segments, each audio segment corresponding to a slide that is displayed concurrently with its corresponding audio segment;

(c) storing the recorded plurality of audio segments;

(d) associating each audio segment with its corresponding slide, wherein each audio segment is determinable from its associated slide;

(e) selectively enabling the playing of each audio segment when its corresponding slide is displayed; and (f) enabling a length for each audio segment to determine the automatic advancement of its corresponding slide during the presentation of a slide show.

26. The program storage device of claim 25, wherein recording the voice narration further comprises:

(a) receiving an analog voice audio input signal;

(b) converting the analog voice audio input signal to a digital voice audio signal; and (c) wherein each audio segment comprises a duration of the digital voice audio signal.

27. The program storage device of claim 26, wherein the storing step further comprises storing each recorded audio segment in a computer file, and wherein the associating step further comprises storing with each slide a reference for locating its corresponding audio segment in a corresponding computer file.

28. The program storage device of claim 26, wherein the storing step further comprises storing each recorded audio segment in a corresponding computer sound file containing exactly one audio segment.

29. The program storage device of claim 26, wherein the storing step further comprises storing the audio segments and the slides together in one computer file.

* * * * *

UNITED STATES PATENT AND TRADEMARK OFFICE
CERTIFICATE OF CORRECTION

PATENT NO.   :   6,084,582
DATED        :   July 4, 2000
INVENTOR(S)  :   I.I. Qureshi et al.

Page 1 of 2

It is certified that error appears in the above-identified patent and that said Letters Patent is hereby corrected as shown below:

| COLUMN | LINE | ERROR |
|---|---|---|
| [56] Pg. 1, col. 2 | Refs. Cited (Other Publs., Item 1) | after "al.," insert a space |
| [56] Pg. 1, col. 2 | Refs. Cited (Other Publs., Item 2) | after "Jesshope" insert --,-- |
| [56] Pg. 1, col. 2 | Refs. Cited (Other Publs., Item 4) | after "Blakowski, G." insert --,-- |
| [56] Pg. 1, col. 2 | Refs. Cited (Other Publs., Item 6) | after "Aboud" insert --,-- |
| [56] Pg. 1, col. 2 | Refs. Cited (Other Publs., Item 6) | "teaching" should read --Teaching-- |
| [56] Pg. 2, col. 2 | Refs. Cited (Other Publs., Item 10) | "et al," should read --et al.,-- |

UNITED STATES PATENT AND TRADEMARK OFFICE
CERTIFICATE OF CORRECTION

PATENT NO. : 6,084,582
DATED : July 4, 2000
INVENTOR(S) : I.I. Qureshi et al.

It is certified that error appears in the above-identified patent and that said Letters Patent is hereby corrected as shown below:

| COLUMN | LINE | ERROR |
|---|---|---|
| 10 (Claim 9, | 43 line 1) | after "1" insert --,-- |

Signed and Sealed this

Twenty-ninth Day of May, 2001

Attest:

NICHOLAS P. GODICI

*Attesting Officer*   Acting Director of the United States Patent and Trademark Office